United States Patent
Emanuel et al.

(10) Patent No.: US 6,524,742 B1
(45) Date of Patent: Feb. 25, 2003

(54) ELECTRICALLY CONDUCTIVE, FREESTANDING MICROPOROUS POLYMER SHEET

(75) Inventors: James Emanuel, Corvallis, OR (US); James Young, Sunriver, OR (US); Richard W. Pekala, Corvallis, OR (US)

(73) Assignee: Amtek Research International LLC, Lebanon, OR (US)

(*) Notice: Subject to any disclaimer, the term of this patent is extended or adjusted under 35 U.S.C. 154(b) by 0 days.

(21) Appl. No.: 09/507,174

(22) Filed: Feb. 18, 2000

Related U.S. Application Data
(60) Provisional application No. 60/120,842, filed on Feb. 19, 1999.

(51) Int. Cl.[7] ................................................ H01M 2/14
(52) U.S. Cl. .............................. 429/129; 429/237
(58) Field of Search ......................... 429/129, 132, 429/137, 237, 247

(56) References Cited

U.S. PATENT DOCUMENTS

| | | | |
|---|---|---|---|
| 3,351,495 A | 11/1967 | Larsen et al. | 136/146 |
| 4,400,447 A * | 8/1983 | Gerenser et al. | 429/27 |
| 4,668,595 A | 5/1987 | Yoshino et al. | 429/194 |
| 4,959,281 A | 9/1990 | Nishi et al. | 429/194 |
| 5,028,500 A | 7/1991 | Fong et al. | 429/194 |
| 5,143,805 A | 9/1992 | Anderman et al. | 429/217 |
| 5,296,318 A | 3/1994 | Gozdz et al. | 429/192 |
| 5,418,091 A | 5/1995 | Gozdz et al. | 429/252 |
| 5,456,000 A | 10/1995 | Gozdz et al. | 29/623.2 |
| 5,593,462 A * | 1/1997 | Gueguen et al. | 29/623.3 |
| 5,641,565 A * | 6/1997 | Sogo | 428/315.7 |
| 5,714,279 A | 2/1998 | Zajac, Jr. et al. | 429/194 |
| 5,744,264 A | 4/1998 | Barker | 429/218 |
| 5,749,927 A * | 5/1998 | Chern et al. | 29/623.5 |
| 5,871,865 A | 2/1999 | Barker et al. | 429/223 |
| 5,879,836 A | 3/1999 | Ikeda et al. | 429/231.8 |
| 5,928,812 A * | 7/1999 | Xue | 429/304 |
| 6,148,503 A * | 12/2000 | Delnick et al. | 29/623.1 |
| 6,171,723 B1 | 1/2001 | Loch et al. | |
| 6,180,281 B1 * | 1/2001 | Schneider et al. | 429/129 |

FOREIGN PATENT DOCUMENTS

| | | | |
|---|---|---|---|
| CA | 2231482 | 9/1998 | H01M/10/24 |
| EP | 0256205 | 2/1988 | |
| EP | 0603500 | 6/1994 | C08J/9/28 |
| EP | 0858120 | 8/1998 | |
| EP | 0867267 A2 | 9/1998 | B29C/47/00 |
| JP | 11086848 | 3/1999 | |
| WO | 9834977 | 8/1998 | C08J/5/18 |
| WO | WO 98/44576 | 10/1998 | H01M/4/04 |
| WO | 9934466 | 7/1999 | |

OTHER PUBLICATIONS

Ashley, Steven, *Surging ahead with ultracapacitors*, Mechanical Engineering, Feb. 1995, pp. 76–79.

Mayer, S. T., Pekala, R. W., Kaschmitter, J. L., *The Aerocapacitor: An Electrochemical Double–Layer Energy–Storage Device*, J. Electrochem, Soc., vol. 140, No. 2, 1993, pp. 446–451.

Burke, Andrew, *Ultracapacitors: why, how and where is the technology*, Journal of Power Sources, vol. 91, 2000, pp 37–50.

\* cited by examiner

*Primary Examiner*—Patrick Ryan
*Assistant Examiner*—M. Wills
(74) *Attorney, Agent, or Firm*—Stole Rives LLP (57) ABSTRACT

A freestanding, microporous polymer sheet (52, 56) is composed of a polymer matrix binding and electrically conductive matrix. The polymer matrix preferably includes UHMWPE, and the electrically conductive matrix preferably is in powder form. The UHMWPE is of a molecular weight that provides sufficient molecular chain entanglement to form a sheet, with freestanding characteristics. Multiple microporous sheets (30) can be wound or stacked in a package filled with an electrolyte to function as electrodes in an energy storage device (86), such as a battery. Metallic layers (81, 83) can be applied to the microporous sheets to function as current collectors in such devices.

18 Claims, 2 Drawing Sheets

ELECTRICALLY CONDUCTIVE, FREESTANDING MICROPOROUS POLYMER SHEET

This application claims the benefit of Provisional Application No. 60/120,842, filed Feb. 19, 1999.

TECHNICAL FIELD

This invention relates to the formation of an electrically conductive, freestanding microporous polymer sheet and, in particular, to such a sheet for use in the manufacture of energy storage and other suitable devices.

BACKGROUND OF THE INVENTION

The following background information is presented by way of example with reference to the manufacture of electrodes used in energy storage devices. Descriptions of the construction details of energy storage devices relevant to the present invention are set forth in David Linden (Editor in Chief), *Handbook of Batteries*, $2^{nd}$ ed., McGraw-Hill, Inc. (1995). Electrode preparation for many energy storage devices begins with the formation of a slurry containing an electrochemically active material in powder form, a fluoropolymer, and solvent. The slurry is coated onto a metal foil that acts as a current collector. The metal foil coated with the electrochemically active material is then passed through a drying oven to remove the solvent. The fluoropolymer acts as a binder that holds together the electrochemically active material and forms a porous electrode. Often the electrode is calendered to densify the electrochemically active material coated on the current collector by increasing the volume or packing fraction of the electrochemically active material and thereby reducing the porosity of the electrode. The current collector functions also as a carrier for the electrochemically active material and the binder because the combination of the two of them is of insufficient mechanical integrity to stand on its own. The electrode is then cut into ribbons for winding or stacking into a packaged energy storage device.

Fluoropolymers, such as polyvinylidene fluoride, have historically been used as polymer binders because of their electrochemical and chemical inactivity in relation to most polymer, gel, or liquid electrolytes. However, it is difficult, if not impossible, to produce freestanding porous electrodes utilizing fluoropolymers at. traditional binder contents (2–10 wt. %) because their low molecular weights provide inadequate chain entanglement. Other binders such as EPDM rubber and various types of polyethylene can be used, but they also do not provide microporous sheets with freestanding properties. "Freestanding" refers to a sheet having sufficient mechanical properties that permit manipulation such as winding and unwinding in sheet form for use in an energy storage device assembly.

A special type of polyethylene, ultrahigh molecular weight polyethylene (UHMWPE), can be used to make a microporous sheet with freestanding properties at the binder contents specified above. The repeat unit of polyethylene is shown below:

where x represents the average number of repeat units in an individual polymer chain. In the case of polyethylene used in many film and molded part applications, x equals about $10^3$–$10^4$ whereas for UHMWPE x equals about $10^5$. This difference in the number of repeat units is responsible for the higher degree of chain entanglement and the unique properties of UHMWPE.

One such property is the ability of UHMWPE to resist material flow under its own weight when the UHMWPE is heated above its crystalline melting point. This phenomenon is a result of the long relaxation times required for individual chains to slip past one another. UHMWPE exhibits excellent chemical and abrasion resistance, and the hydrocarbon composition of UHMWPE has a much lower skeletal density (0.93 g/cc) than many of the fluoropolymers commonly used in electrode preparation. Such commonly used fluoropolymers include polyvinylidene fluoride (1.77 g/cc) and polytetrafluoroethylene (2.2 g/cc).

UHMWPE is commonly used as the polymer matrix or binder for separators used in lead-acid batteries. Such separators result from the extrusion, calendering, and extraction of mixtures containing UHMWPE, precipitated silica, and processing oil. The resultant separators have many advantages: high porosity (50–60%), a dentritic growth-inhibiting ultrafine pore size, low electrical resistence, good oxidation resistance, and sealability into a pocket configuration. These separators usually contain a silica to UHMWPE weight ratio from about 2.5 to about 3.5 or a corresponding volume fraction ratio in the range of 1.0 to 1.5. Such separators are designed to prevent electronic conduction (i.e., short circuits) between the anode and cathode while permitting ionic conduction via the electrolyte that fills the pores.

While UHMWPE is an integral part of separator technology, its use in the extrusion and extraction of freestanding, electrically conductive porous film electrodes has never been achieved. This invention addresses the desire to fabricate such film electrodes for use in energy storage and other electronic device applications.

SUMMARY OF THE INVENTION

An object of the present invention is, therefore, to provide an electrically conductive, freestanding microporous polymer sheet formed at a relatively high volume fraction of the electrically conductive matrix (composed of an electrochemically active powder and an electrically conductive agent, if required) to the polymer matrix and having sufficient mechanical properties for use in energy storage and other electronic device applications.

The present invention is a freestanding, microporous polymer sheet that is composed of a polymer matrix binding a material composition (i.e., the electrically conductive matrix) having electrical conductivity properties. The polymer matrix preferably includes UHMWPE, and the material composition preferably is in powder form. The UHMWPE is of a molecular weight that provides sufficient molecular chain entanglement to form a sheet with freestanding characteristics, and the material composition powders have relatively small surface areas and substantially reduced oil absorption values as compared to precipitated silica as used in battery separator technology. The polymer matrix of the sheet does not exceed a volume fraction of about 0.20, and the volume fraction of voids or pores of the polymer sheet is between about 0.25 and about 0.8.

Multiple microporous sheets can be wound or stacked in a package filled with an electrolyte to function as electrodes in an energy storage device, such as a battery. Metallic layers can be applied to the microporous sheets to function as current collectors in such devices.

In a first preferred embodiment of the invention, the freestanding, microporous polymer sheet is manufactured by combining UHMWPE, a material composition in powder form and having electrical conductivity properties, and a plasticizer (e.g., mineral oil). A mixture of UHMWPE and the material composition powder is blended with the plasticizer in sufficient quantity and extruded to form a homogeneous, cohesive mass. A blown film process or another traditional calendering method is used to shape the oil-filled sheets to their final thicknesses. In an extraction operation similar to that used for the production of lead acid battery separators, the oil is removed from the sheets. Metallic layers are then applied to the extracted sheets to form current collectors. A metallic layer can be one of a metal film formed by sputter deposition on, electroless deposition on, electrodeposition on, plasma spraying on, or roll coating of a metal slurry on the microporous sheet; or a porous or nonporous metal foil laminated to the microporous sheet. In some cases, sufficient metal powder can be incorporated in the polymer sheet such that a metallic layer as described above is not required.

In a second preferred embodiment of the invention, a polymer matrix, containing an UHMWPE in an amount and of a molecular weight sufficient to provide the necessary molecular chain entanglement to form a freestanding microporous sheet, binds a material composition having electrical conductivity properties. The resulting electrically conductive sheet is wound or stacked in a package, and the pores of the sheet are filled with an electrolyte and used as one of many electrodes in an energy storage device, for example, a battery, capacitor, supercapacitor, or fuel cell. One of the benefits of this polymer matrix is that it can be used to form, and potentially provide intimate contact between adjacent layers of, the anode, cathode, or separator.

In a third preferred embodiment of the invention, multiple extruders are used to simultaneously produce anode, cathode, and separator films that are formed in accordance with a continuous coextrusion process or are laminated together at the end of a continuous process. This process promotes an integral, coherent bond between adjacent anode, cathode, and separator layers and reduces the risk of delamination during extraction. This process also provides intimate contact between the anode and the separator and between the cathode and the separator without collapsing porosity at adjacent layer interfaces. The resultant multiple layer ribbon with one or more current collectors is cut to size, and the pores are filled with electrolyte to produce an energy storage device.

Additional objects and advantages of this invention will be apparent from the following detailed description of preferred embodiments thereof which proceeds with reference to the accompanying drawings.

DETAILED DESCRIPTION OF PREFERRED EMBODIMENTS

The polymeric material preferably used in this invention is an ultrahigh molecular weight polyolefin. The polyolefin most preferably used is an ultrahigh molecular weight polyethylene (UHMWPE) having an intrinsic viscosity of at least 10 deciliter/gram, and preferably greater than about 14–18 deciliters/gram. It is not believed that there is an upper limit on intrinsic viscosity for the UHMWPEs usable in this invention. Current commercially available UHMW-PEs have an upper limit of intrinsic viscosity of about 29 deciliters/gram.

The plasticizer employed in the present invention is a nonevaporative solvent for the polymer, and is preferably a liquid at room temperature. The plasticizer has little or no solvating effect on the polymer at room temperature; it performs its solvating action at temperatures at or above the softening temperature of the polymer. For UHMWPE, the solvating temperature would be above about 160° C., and preferably in the range of between about 160° C. and about 220° C. It is preferred to use a processing oil, such as a paraffinic oil, naphthenic oil, aromatic oil, or a mixture of two or more such oils. Examples of suitable processing oils include: oils sold by Shell Oil Company, such as Shell-Flex™ 3681, Gravex™ 41, Catnex™ 945; and oils sold by Chevron, such as Chevron 500R; and oils sold by Lyondell, such as Tufflo™ 6056.

Any solvent for extracting the processing oil from the individual films or multiple layer film may be used in the extraction process, so long as the solvent is not deleterious to the electrode active ingredients contained in the polymer matrix and has a boiling point that makes it practical to separate the solvent from the plasticizer by distillation. Such solvents include 1,1,2 trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

In some cases, it is desirable to select the processing oil such that any residual oil in the polymer sheet after extraction is electrochemically inactive.

A first preferred embodiment of the present invention is use of the freestanding microporous film as a composition. The terms "film" and "sheet" are used interchangeably throughout this patent application to describe products made in accordance with the invention, and the term "web" is used to encompass films and sheets. The practice of the invention is not limited to a specific web thickness. The present invention forms a freestanding microporous polymer sheet, which is manufactured by combining an UHMWPE, an electrochemically active powder and an electrically conductive agent (e.g., carbon black), if required, with sufficient plasticizer at an appropriate temperature to allow formation of a homogeneous, cohesive sheet. The electrochemically active powders used to form these sheets vary widely. Some examples are as follows:

EXAMPLE 1

Production of a Zinc-Containing Sheet

UHMWPE (1900 HCM; Montell Polyolefins, 2.1 g) was added to zinc powder (<10 μm particle size; Aldrich Chemical Co., 56.0 g) in a 250 ml plastic beaker. The powders were blended with a spatula until a homogeneous mixture formed, at which time ShellFlex™ 3681 process oil (Shell Oil Co., 9.2 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (8.0 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.7 mm, and the resulting polymer sheet was removed from the rolls with a take-off knife.

The sheet was allowed to cool to room temperature, and then a razor blade was used to cut 40 mm×60 mm specimens from the sheet. The specimens were next placed in a 500 ml trichloroethylene bath in which a magnetic stir bar was used to circulate the solvent, thereby promoting extraction of the ShellFlex™ 3681 oil. This procedure was repeated three times with fresh trichloroethylene to ensure that the oil was fully extracted from the specimens. The trichloroethylene-laden specimens were dried in a fume hood for five minutes at 20° C., followed by 15 minutes at 90° C. in a forced air oven.

The resultant porous sheet having a 0.66 mm thickness was weighed and measured to determine its density. A density of 2.91 g/cc was recorded, and porosity of 49.4% was calculated from the skeletal densities of the respective phases.

The following three Comparative Examples A, B, and C demonstrate the impact of UHMWPE in the successful production of a freestanding microporous polymer sheet, such as the sheet described in Example 1.

Comparative Example A

Polyvinylidene fluoride (Kynar 461; Elf-Atochem, 7.5 g) was added to zinc powder (<10 μm particle size; Aldrich Chemical Co., 104.3 g) in a 250 ml plastic beaker. The powders were blended with a spatula until a homogeneous mixture formed, at which time dibutyl phthalate (DBP) (Aldrich Chemical Co., 15.0 g) was added. The DBP-containing mixture was stirred until a free-flowing state was achieved, and then the mixture was placed in a HAAKE Rheomix 600 miniature intensive mixer fitted with roller blades and driven by a HAAKE Rheocord 90 torque Rheometer, turning at 80 RPM and set at 160° C. Additional DBP (21.6 g) was added to the miniature intensive mixer. The resultant mixture was compounded for 5 minutes, resulting in a low viscosity, oily mixture that was not transferable to the C. W. Brabender Prep-Mill two-roll mill. A cohesive sheet was never achieved, even though the mixture contained the same volume fractions of polymer, zinc, and oil as outlined in Example 1.

Comparative Example B

Using the same procedure as outlined in Comparative Example A, a mixture containing zinc powder (<10 μm particle size; Aldrich Chemical Co., 104.3 g), polyvinylidene fluoride (Kynar 461; Elf-Atochem, 7.5 g), and dibutyl phthalate (DBP) (Aldrich Chemical Co., 18.3 g) was prepared in the HAAKE Rheomix 600 miniature intensive mixer at 160° C. The resultant mixture was compounded for 5 minutes, resulting in a paste that was not transferable to the C. W. Brabender Prep-Mill two-roll mill. A cohesive sheet was not achieved, even though this formulation contained 18.3 g less dibutyl phthalate than (i.e., one-half of) that contained in the formulation of Comparative Example A.

Comparative Example C

Using the same procedure as outlined in Comparative Example A, a mixture containing zinc powder (<10 μm particle size; Aldrich Chemical Co., 104.3 g), polyvinylidene fluoride (Kynar 461; Elf-Atochem, 9.0 g), and dibutyl phthalate (DBP) (Aldrich Chemical Co., 18.3 g) was prepared in the HAAKE Rheomix 600 miniature intensive mixer at 160° C. and then transferred to the Brabender Prep-Mill two-roll mill, turning at 15 rpm and set at 135° C. A cohesive sheet was not achieved, even though this formulation contained 1.5 g more polyvinylidene fluoride than that contained in the formulation of Comparative Example B.

EXAMPLE 2

Production of a Nickel-Containing Sheet

UHMWPE (1900 HCM; Montell Polyolefins, 2.64 g) was added to nickel powder (3 μm particle size; Aldrich Chemical Co., 56.0 g) in a 250 ml plastic beaker. The powders were blended with a spatula until a homogeneous mixture formed, at which time ShellFlex™ 3681 process oil (Shell Oil Co., 12.0 g) was added. The oil-containing mixture was stirred until a free-flowing state was achieved, and then the mixture was placed into a HAAKE Rheomix 600, miniature intensive mixer fitted with roller blades and driven by a HAAKE Rheocord 90 torque Rheometer, turning at 80 RPM and set at 180° C. Additional oil (8.0 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.4 mm, and the resulting polymer sheet was removed from the rolls with a take-off knife.

The oil-filled sheet was extracted as outlined in Example 1.

The resultant porous sheet having a 0.37 mm thickness was weighed and measured to determine its density. A density of 2.12 g/cc was recorded, and porosity of 67.0% was calculated from the skeletal densities of the respective phases.

EXAMPLE 3

Production of a Graphite-Containing Sheet

UHMWPE (1900 H; Montell Polyolefins, 10.0 g) and conductive carbon black (Super P; MMM Carbon, 5.0 g) were added to graphite powder (BG-35; Superior Graphite Co., 85.0 g) in a 250 ml plastic beaker. The powders were blended with a spatula until a homogeneous mixture formed, at which time ShellFlex™ 3681 process oil (Shell Oil Co., 20.0 g) was added. The oil-containing mixture was stirred until a free-flowing state was achieved, and then the mixture was placed into a HAAKE Rheomix 600 large intensive mixer fitted with roller blades and driven by a HAAKE Rheocord 90 torque Rheometer, turning at 80 RPM and set at 180° C. Additional oil (80.0 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 1.2 mm, and the resulting polymer sheet was removed from the rolls with a take-off knife.

The oil-filled sheet was extracted as outlined in Example 1.

The resultant porous sheet having a 1.2 mm thickness was weighed and measured to determine its density. A density of

EXAMPLE 4

Production of a Granulated Carbon-Containing Sheet

UHMWPE (1900 HCM; Montell Polyolefins, 1.0 g) was added to granulated carbon powder (ENSACO 350; MMM Carbon, 10.0 g having a surface area of about 800 $m^2/g$) in a 250 ml plastic beaker. The powders were blended with a spatula until a homogeneous mixture formed, at which time ShellFlex™ 3681 process oil (Shell Oil Co., 25.0 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (13.4 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.3 mm, and the resulting polymer sheet was removed from the rolls with a take-off knife.

The oil-filled sheet was extracted as outlined in Example 1.

The resultant porous sheet having a 0.29 mm thickness was weighed and measured to determine its density, which was recorded as 0.41 g/cc.

EXAMPLE 5

Production of an Activated Carbon-Containing Sheet

UHMWPE (1900 HCM; Montell Polyolefins, 1.0 g) was added to activated carbon powder (Norit SX Ultra; NORIT Americas Inc., 10.0 g having a surface area of about 1150 $m^2/g$) in a 250 ml plastic beaker. The powders were blended with a spatula until a homogeneous mixture formed, at which time ShellFlex™ 3681 process oil (Shell Oil Co., 12.0 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (6.9 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.3 mm, and the resulting polymer sheet was removed from the rolls with a take-off knife.

The oil-filled sheet was extracted as outlined in Example 1.

The resultant porous sheet having a 0.30 mm thickness was weighed and measured to determine its density, which was recorded as 0.43 g/cc.

EXAMPLE 6

Production of a Lithium Cobalt Oxide-Containing Sheet

UHMWPE (1900 HCM; Montell Polyolefins, 9.4 g) and graphite powder (BG-35, Superior Graphite Co., 8.7 g) were added to lithium cobalt oxide powder (OMG Americas Inc., 81.9 g) in a 250 ml plastic beaker. The powders were blended with a spatula until a homogeneous mixture formed, at which time ShellFlex™ 3681 process oil (Shell Oil Co., 15.0 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (12.0 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 170° C. The roll gap was adjusted to about 0.4 mm, and the resulting polymer sheet was removed from the rolls with a take-off knife.

The oil-filled sheet was extracted as outlined in Example 1.

The resultant porous sheet having a 0.36 mm thickness was weighed and measured to determine its density. A density of 1.75 g/cc was recorded, and a porosity of 47.8% was calculated from the skeletal densities of the respective phases.

EXAMPLE 7

Production of a Lithium Manganese Oxide-Containing Sheet

UHMWPE (1900 HCM; Montell Polyolefins, 4.9 g) and conductive carbon black (Super P; MMM Carbon, 6.3 g) were added to lithium manganese oxide powder (Japan Energy Corp., 73.8 g) in a 250 ml plastic beaker. The powders were blended with a spatula until a homogeneous mixture formed, at which time Tufflo process oil 6056 (Lyondell Lubricants, 24.2 g) was added. The oil-containing mixture was stirred until a free-flowing state was achieved, and then the mixture was placed in a HAAKE Rheomix 600 miniature intensive mixer fitted with roller blades and driven by a HAAKE Rheocord 90 torque Rheometer, turning at 80 RPM and set at 180° C. Additional oil (6.0 g) was added to the mixing chamber. The resultant mixture was compounded for 5 minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.3 mm, and a sheet was removed from the rolls with the take-off knife.

The oil-filled sheet was extracted as outlined in Example 1.

The resultant porous sheet having a 0.30 mm thickness was weighed and measured to determine its density, which was recorded as 1.50 g/cc.

EXAMPLE 8

Production of a Manganese Dioxide-Containing Sheet

UHMWPE (1900 HCM; Montell Polyolefins, 2.6 g) and graphite powder (BG-35, Superior Graphite Co., 4.0 g) were added to manganese dioxide powder (alkaline battery grade; Kerr-McGee Chemical LLC., 32.0 g) in a 250 ml plastic beaker. The powders were blended with a spatula until a homogeneous mixture formed, at which time ShellFlex™ 3681 process oil (Shell Oil Co., 8.0 g) was added. The oil-containing mixture was stirred until a free-flowing state was achieved, and then the mixture was placed into a (1.12 g/cc was recorded, and porosity of 42.5% was calculated from the skeletal densities of the respective phases.)

HAAKE Rheomix 600 miniature intensive mixer fitted with roller blades and driven by a HAAKE Rheocord 90 torque Rheometer, turning at 80 RPM and set at 180° C. Additional oil (12.0 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.4 mm, and the resulting polymer sheet was removed from the rolls with a take-off knife.

The oil-filled sheet was extracted as outlined in Example 1.

The resultant porous sheet having a 0.39 mm thickness was weighed and measured to determine its density, which was recorded as 1.27 g/cc.

EXAMPLE 9

Production of a Lead (II, III)—Oxide Containing Sheet

UHMWPE (1900 HCM; Montell Polyolefins, 3.2 g) was added to lead (II, III) oxide powder ($Pb_3O_4$; 1–2 μm; Aldrich Chemical, 145.8 g) in a 250 ml plastic beaker. The powders were blended with a spatula until a homogeneous mixture formed, at which time ShellFlex™ 3681 process oil (Shell Oil Co. 1.5 g) was added. The oil-containing mixture was stirred until a free-flowing state was achieved, and then the mixture was placed in a HAAKE Rheomix 600.miniature intensive mixer fitted with roller blades and driven by a HAAKE Rheocord 90 torque Rheometer, turning at 80 RPM and set at 180° C. Additional oil (22.8 g) was added to the mixing chamber. The resultant mixture was compounded for 5 minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.7 mm, and a sheet was removed from the rolls with the take-off knife after lowering the roll temperature to 130° C.

The oil-filled sheet was extracted as outlined in Example 1.

The resultant porous sheet having a 0.67 mm thickness was weighed and measured to determine its density, which was recorded as 3.93 g/cc.

EXAMPLE 10

Production of a Lead (II)—Oxide Containing Sheet

UHMWPE (1900 HCM; Montell Polyolefins, 1.4 g), barium sulfate ($BaSO_4$; Aldrich Chemical, 2.1 g), and conductive carbon black (Super P; MMM Carbon, 0.2 g) were added to lead (II) oxide powder (PbO; Aldrich Chemical, 88.7 g) in a 250 ml plastic beaker. The powders were blended with a spatula until a homogeneous mixture formed, at which time ShellFlex™ 3681 process oil (Shell Oil Co., 1.0 g) was added. The oil-containing mixture was stirred to a free-flowing state was achieved, and then the mixture was placed in a HAAKE Rheomix 600 miniature intensive mixer fitted with roller blades and driven by a HAAKE Rheocord 90 torque Rheometer, turning at 80 RPM and set at 180° C. Additional oil (11.0 g) was added to the mixing chamber. The resultant mixture was compounded for 5 minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.8 mm, and a sheet was removed from the rolls with the take-off knife after lowering the roll temperature to 130 ° C.

The oil-filled sheet was extracted as outlined in Example 1.

The resultant porous sheet having a 0.86 mm thickness was weighed and measured to determine its density, which was recorded as 4.06 g/cc.

EXAMPLE 11

Production of a Nickel Hydroxide-Containing Sheet

UHMWPE (1900 HCM; Montell Polyolefins, 1.9 g) and graphite powder (BG-35; Superior Graphite Co., 3.9 g) were added to nickel hydroxide powder (OMG Americas Inc., 20.7 g) in a 250 ml plastic beaker. The powders were blended with a spatula until a homogeneous mixture formed, at which time ShellFlex™ 3681 process oil (Shell Oil Co., 14.8 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (3.0 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 175° C. The roll gap was adjusted to about 0.5 mm, and the resulting polymer sheet was removed from the rolls with a take-off knife.

The oil-filled sheet was extracted as outlined in Example 1.

The resultant porous sheet having a 0.52 mm thickness was weighed and measured to determine its density, which was recorded as 0.87 g/cc.

EXAMPLE 12

Production of a Graphite-Containing Sheet

UHMWPE (1900 HCM; Montell Polyolefins, 2.1 g) and conductive carbon black (Super P; MMM Carbon, 1.7 g) were added to graphite powder (BG-35; Superior Graphite Co., 46.1 g) in a 250 ml plastic beaker. The powders were blended with a spatula until a homogeneous mixture formed, at which time ShellFlex™ 3681 process oil (Shell Oil Co., 15.0 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (10.9 g) was added to the mixing chamber. The resultant mixture was compounded for five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.6 mm, and the resulting polymer sheet was removed from the rolls with a take-off knife.

The oil-filled sheet was extracted as outlined in Example 1.

The resultant porous sheet having a 0.58 mm thickness was weighed and measured to determine its density. A density of 0.88 g/cc was recorded, and porosity of 58.2% was calculated from the skeletal densities of the respective phases.

EXAMPLE 13

Production of a Graphite-Containing Sheet

Example 13 uses the formulation described in Example 12, with the exception that the polymer matrix in this formulation is composed in a 3:1 weight ratio of UHMWPE and HDPE in the production of a graphite/conductive carbon black electrode. Using the same procedure as outlined in Example 12, a porous sheet was formed from a mixture containing graphite powder (BG-35; Superior Graphite Co., 46.1 g), conductive carbon black (Super P; MMM Carbon, 1.7 g), UHMWPE (1900 HCM; Montell Polyolefins, 1.6 g), high density polyethylene (HDPE) (1288; Fina Chemical, 0.5 g), and ShellFlex™ 3681 process oil (25.9 g). In this case, the oil-filled sheet was removed from the two-roll mill at 135° C. After extraction, the porous sheet had a thickness of 0.25 mm and a density of 0.90 g/cc.

EXAMPLE 14

Production of a Graphite-Containing Sheet

Example 14 uses the formulation described in Example 13, with the exception that the polymer matrix in this formulation is composed of equal amounts of UHMWPE and HDPE in the production of a graphite/conductive carbon black electrode. Using the same procedure as outlined in Example 12, a porous sheet was formed from a mixture containing graphite powder (BG-35; Superior Graphite Co., 46.1 g), conductive carbon black (Super P; MMM Carbon, 1.7 g), UHMWPE (1900 HCM; Montell Polyolefins, 1.05 g), high density polyethylene (HDPE) (1288; Fina Chemical, 1.05 g), and ShellFlex™ 3681 process oil (25.9 g). In this case, the oil-filled sheet was removed from the two-roll mill at 135° C. After extraction, the porous sheet had a thickness of 0.25 mm and a density of 0.88 g/cc.

The following two Comparative Examples D and E demonstrate the impact of the use of UHMWPE in an effective amount in the successful production of a freestanding microporous polymer sheet, such as that described in Example 14.

Comparative Example D

Conductive carbon black (Super P; MMM Carbon, 1.7 g), UHMWPE (1900 HCM; Montell Polyolefins, 0.5 g), and high density polyethylene (HDPE) (1288; Fina Chemical, 1.6 g) were added to graphite powder (BG-35; Superior Graphite Co., 46.1 g) in a 250 ml plastic beaker. The powders were blended with a spatula until a homogeneous mixture formed, at which time ShellFlex™ 3681 process oil (Shell Oil Co., 15.0 g) was added. The oil-containing mixture was stirred until a free-flowing state was achieved, and then the mixture was placed in a HAAKE Rheomix 600 miniature intensive mixer fitted with roller blades and driven by a HAAKE Rheocord 90 torque Rheometer, turning at 80 RPM and set at 180° C. Additional oil (10.9 g) was added to the mixing chamber. The resultant mixture was compounded for 5 minutes, forming a weak paste that was not transferable to the C. W. Brabender Prep-Mill two-roll mill. A cohesive sheet was never achieved with the low UHMWPE content in this formulation.

Comparative Example E

Using the same procedure as outlined in Comparative Example D, a mixture containing graphite powder (BG-35; Superior Graphite Co., 46.1 g), conductive carbon black (Super P; MMM Carbon, 1.7 g), high density polyethylene (HDPE) (1288; Fina Chemical, 2.1 g), and ShellFlex™ 3681 process oil (Shell Oil Co., 25.9 g) was prepared in the HAAKE Rheomix 600 miniature intensive mixer at 180° C. The resultant mixture was compounded for 5 minutes, forming a weak paste that was not transferable to the C. W. Brabender Prep-Mill two-roll mill. A cohesive sheet was never achieved for this formulation, which contained no UHMWPE.

Examples 12, 13, and 14 demonstrate that the present invention encompasses a polymer matrix composed of UHMWPE, either as a sole polymer material or as one of multiple polymer materials, including, but not limited to, high density polyethylene (HDPE). Table 1 shows, however, that evaluation of the extracted sheets formed in accordance with Examples 12–14 reveals that the samples produced with higher UHMWPE content have better mechanical properties. (Table 1 also shows that no sheet was formed with the lower amounts of UHMWPE used in the Comparative Examples D and E.) The data set out in Table 1 were obtained from three samples cut from each sheet into 2.5 cm×7.5 cm strips and evaluated on an Instron machine (Model #4301). All testing was done at a crosshead speed of 50 cm/min. The values reported in Table 1 are average values.

TABLE 1

| UHMWPE/HDPE ratio | Density (g/cc) | Modulus (ksi) | Tensile Strength (psi) | % Strain at Break (%) |
|---|---|---|---|---|
| 100/0 | 0.88 | 7.4 | 344 | 10.6 |
| 75/25 | 0.90 | 4.9 | 224 | 9.1 |
| 50/50 | 0.88 | 3.6 | 140 | 6.4 |
| 25/75 | | | No Sheet Formed | |
| 0/100 | | | | |

EXAMPLE 15

Production of Graphite-Containing Sheet

UHMWPE (1900 HCM; Montell Polyolefins, 2.1 g), polyvinylidene fluoride copolymer (Kynar 2801; Elf-Atochem, 0.21 g), and conductive carbon black (Super P; MMM Carbon, 1.7 g), were added to graphite powder (BG-35; Superior Graphite Co., 46.1 g) in a 250 ml plastic beaker. The powders were blended with a spatula until a homogeneous mixture formed, at which time ShellFlex™ 3681 process oil (Shell Oil Co., 22.9 g) was added. The oil-containing mixture was stirred until a free-flowing state was achieved, and then the mixture was placed in a HAAKE Rheomix 600 miniature intensive mixer fitted with roller blades and driven by a HAAKE Rheocord 90 torque Rheometer, turning at 80 RPM and set at 180° C. Additional oil (3.0 g) was added to the mixing chamber. The resultant mixture was compounded for 5 minutes, resulting in a homogeneous, cohesive mass. This mass was transferred to a C. W. Brabender Prep-Mill Model PM-300, two-roll mill, turning at 15 rpm and set at 170° C. The roll gap was adjusted to about 0.3 mm, and a sheet was removed from the rolls with the take-off knife after lowering the roll temperature to 157° C.

The oil-filled sheet was extracted as outlined in Example 1.

The resultant porous sheet having a 0.33 mm thickness was weighed and measured to determine its density, which was recorded as 0.91 g/cc.

EXAMPLE 16

Production of Graphite-Containing Sheet

Example 16 uses the formulation described in Example 15, with the exception that this formulation uses a polyvinylidine fluoride homopolymer. Using the same procedure as outlined in Example 15, a porous sheet was formed from a mixture containing graphite powder (BG-35; Superior Graphite Co., 46.1 g), conductive carbon black (Super P; MMM Carbon, 1.7 g), polyvinylidene fluoride (Kynar 741; Elf-Atochem, 0.21 g), UHMWPE (1900 HCM; Montell Polyolefins, 2.1 g), and ShellFlex™ 3681 process oil (Shell Oil Co., 25.9 g). After extraction, the porous sheet had a thickness of 0.38 mm and a density of 0.92 g/cc.

EXAMPLE 17

Production of Graphite-Containing Sheet

Example 17 uses the formulation described in Example 15, with the exception that this formulation includes an additional amount of polyvinylidene fluoride copolymer. Using the same procedure as outlined in Example 15, a porous sheet was formed from a mixture containing graphite powder (BG-35; Superior Graphite Co., 46.1 g), conductive carbon black (Super P; MMM Carbon, 1.7 g), polyvinylidene fluoride copolymer (Kynar 2801; Elf-Atochem, 0.53 g), UHMWPE (1900 HCM; Montell Polyolefins, 2.1 g), and ShellFlex™ 3681 process oil (Shell Oil Co., 25.9 g). After extraction, the porous sheet had a thickness of 0.26 mm and a density of 0.90 g/cc.

EXAMPLE 18

Production of Graphite-Containing Sheet

Example 18 uses the formulation described in Example 15, with the exception that this formulation substitutes polyacrylonitrile for the polyvinylidene fluoride copolymer. Using the same procedure as outlined in Example 15, a porous sheet was formed from a mixture containing graphite powder (BG-35; Superior Graphite Co., 46.1 g), conductive carbon black (Super P; MMM Carbon, 1.7 g), polyacrylonitrile (Aldrich Chemical, 0.21 g), UHMWPE (1900 HCM; Montell Polyolefins, 2.1 g), and ShellFlex™ 3681 process oil (Shell Oil Co., 25.9 g). After extraction, the porous sheet had a thickness of 0.36 mm and a density of 0.95 g/cc.

EXAMPLE 19

Production of Graphite-Containing Sheet

Example 19 uses the formulation described in Example 15, with the exception that this formulation substitutes polyethylene oxide for the polyvinylidene fluoride copolymer. Using the same procedure as outlined in Example 15, a porous sheet was formed from a mixture containing graphite powder (BG-35; Superior Graphite Co., 46.1 g), conductive carbon black (Super P; MMM Carbon, 1.7 g), polyethylene oxide (Polyox WSR Coagulant; Union Carbide, 0.21 g), UHMWPE (1900 HCM; Montell Polyolefins, 2.1 g), and ShellFlex™ 3681 process oil (Shell Oil Co., 25.9 g). After extraction, the porous sheet had a thickness of 0.40 mm and a density of 0.93 g/cc.

A second preferred embodiment of the invention is directed to use of the freestanding microporous polymer sheet in an energy storage device. The polymer sheet is especially useful in such devices because it is freestanding, porous, electrically conductive, and-electrochemically active. Energy storage devices in which the invention can be used include, but are not limited to, capacitors, supercapacitors, batteries, and fuel cells.

A first preferred implementation of this second preferred embodiment is the use of the freestanding microporous polymer film in a battery. A battery converts chemical energy to electrical energy. A wide variety of electrochemically active materials can be used to form the anode and cathode in batteries as referenced in the *Handbook of Batteries*. These materials can include lithium intercalation compounds including lithium nickel oxide, lithium cobalt oxide, and lithium manganese oxide; lead (II) oxide, lead (II, III) oxide, and mixtures of lead and lead oxide; manganese dioxide; zinc oxide; nickel; zinc; lead; silver; iron; iron oxides; metal hydrides including lanthanum-nickel ($LaNi_5$); cobalt oxides; hydroxides of nickel, zinc, and cadmium, and cobalt; crystalline or amorphous carbonaceous materials in the form of fiber, powder, or microbeads including natural or synthetic graphite, carbon black, coke, mesocarbon microbeads, or activated carbon. The following examples are illustrative of use of the present invention in various types of batteries.

EXAMPLE 20

Lead-Acid Secondary Cell

TABLE 2

|  | Anode | Cathode | Separator |
| --- | --- | --- | --- |
| $PbO^1$, g | 88.7 | | |
| $BaSO_4^2$, g | 2.1 | | |
| Carbon Black$^3$, g | 0.2 | | |
| $Pb_3O_4^4$, 9 | | 145.8 | |
| Silica$^5$, g | | | 7.0 |
| Colorant$^6$, g | | | 0.2 |
| Lubricant$^7$, g | | | 0.03 |
| Antioxidant$^8$, g | | | 0.03 |
| UHMWPE$^9$, g | 1.4 | 3.2 | 2.4 |
| Oil$^{10}$, g | 12 | 24.3 | 18.0 |

$^1$Litharge (Yellow Lead Oxide), Aldrich Chemical Co.
$^2$Barium Sulfate, Aldrich Chemical Co.
$^3$Super P; MMM Carbon
$^4$Minium (Red Lead Oxide), Aldrich Chemical Co.
$^5$Hi-Sil ® SBG precipitated silica, PPG Industries, Inc.
$^6$ACC10319E, Allied Color Industries, Inc.
$^7$Petrac ® CZ-81, Synthetic Products Corp.
$^8$Irganox ® B-215, Ciba-Geigy Corp.
$^9$1900 HCM, Montell USA Inc.
$^{10}$Shell Flex ™ 3681, Shell Oil Co.

Figure 1:
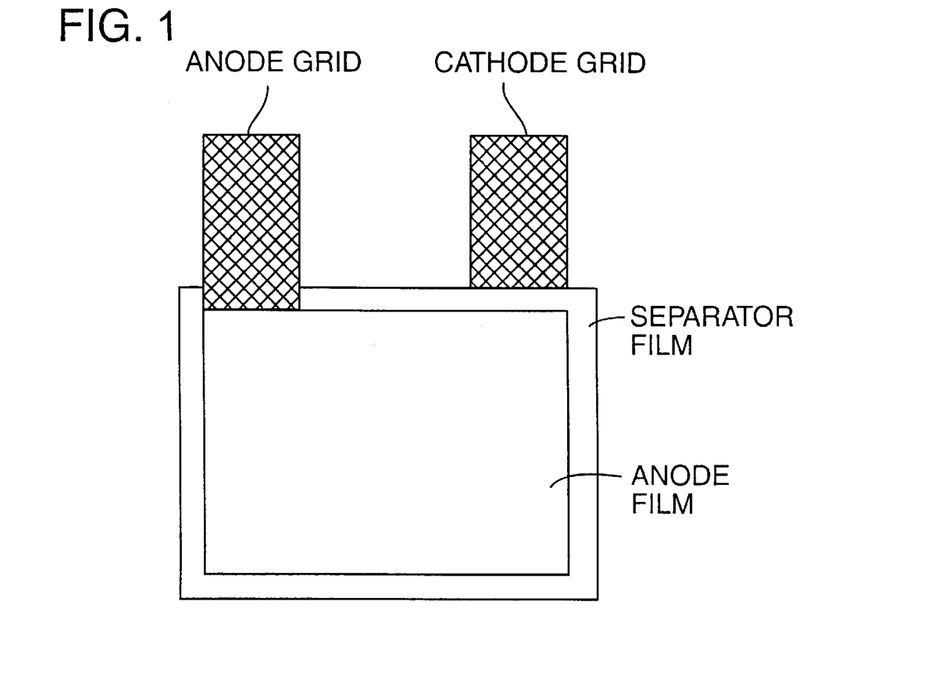
FIGS. 1 and 2 are, respectively, a frontal elevation view and an exploded side elevation view of a lead-acid cell assembly formed of electrodes made in accordance with the present invention.
Figure 2:
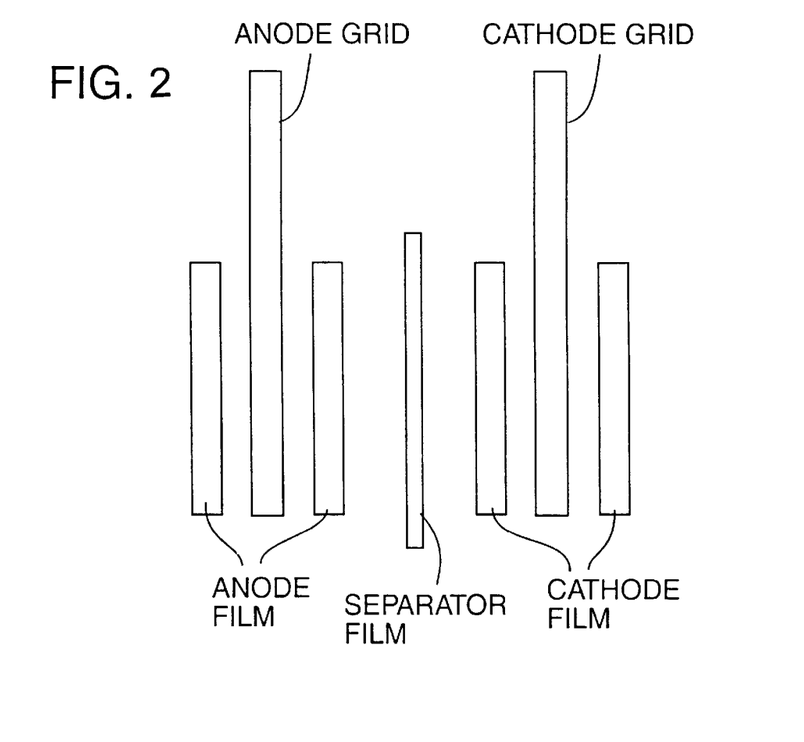

The components of a lead-acid secondary cell manufactured in accordance with Example 20 are set out in Table 2. FIGS. 1 and 2 show respective frontal and exploded views of the resultant lead-acid-cell assembly. The dry anode ingredients in Table 2 were combined in a 600 ml tall form beaker and blended with a spatula. While blending continued, oil (1 g) was added to the mixture. Blending continued until a free flowing powder formed. The free flowing powder was added to a HAAKE Rheomix 600 miniature intensive mixer fitted with roller blades and driven by a HAAKE Rheocord 90 torque Rheometer, turning at 80 RPM and set at 180° C. The remaining oil (11 g) was added to the miniature intensive mixer. This mixture was compounded for approximately five minutes, resulting in a homogeneous, cohesive mass. This mass was transferred to a C. W. Brabender Prep-Mill Model PM-300, two-roll mill, turning at 15 rpm and set at 150° C. The roll gap was adjusted to about 0.67 mm, and a sheet was removed from the rolls with the take-off knife.

The procedure above was repeated for the cathode formula with the following exceptions: oil (1.5 g) was blended with the dry ingredients in a 600 ml tall form beaker, additional oil (22.8 g) was added to the miniature intensive mixer, the temperature of the two-roll mill was 130° C., and the gap on the two-roll mill was set to about 0.8 mm.

The procedure above was repeated for the separator formula with the following exceptions: oil (12 g) was blended with the dry ingredients in a 600 ml tall form beaker, the additional oil (6 g) was added to the miniature intensive mixer, the temperature of the two-roll mill was 173° C., and the gap on the two-roll mill was set to about 0.4 mm.

Two rectangles, each measuring 4 cm×6 cm, were cut from both the anode and cathode sheets. One 6 cm×8 cm rectangle was cut from the separator sheet. Two current collectors, each measuring 4 cm×6 cm, with a 2 cm×10 cm take-off tab, were cut from an expanded lead calcium alloy (0.065 wt. % calcium) strip. The dimensions of the grid wires were 1 mm×1 mm, and the dimensions of the grid openings were 8 mm×7 mm.

One grid was sandwiched between two oil-filled anode sheets, and the tri-layer assembly was laminated in a Model C Carver Laboratory Press, at 143° C. and a pressure not greater than 100 kPa. A second grid was sandwiched between two oil-filled cathode sheets and laminated in a Carver Laboratory Press, at 143° C. and a pressure not greater than 100 kPa. The oil-filled separator sheet was sandwiched between the anode and cathode assemblies prepared above and laminated in a Carver Laboratory Press, at 143° C. and a pressure not greater than 100 kPa. The resulting laminated cell stack was extracted in a 2.0 liter beaker of trichloroethylene with a magnetic stir bar turning at 200 rpm. The extraction was repeated three times with fresh trichloroethylene to ensure that the oil was fully extracted. The trichloroethylene-laden cell stack was dried in a fume hood for five minutes at 20° C., followed by 15 minutes at 90° C. in a forced air oven.

The resultant porous assembly was immersed in a container filled with 1.05 sp. gr. $H_2SO_4$. The cell stack and container were placed in a vacuum desiccator, which was evacuated to a pressure of 125 mm of Hg for one minute, after which the vacuum was released. This evacuation release cycle was repeated five times. The cell assembly was removed from the desiccator and immersed in 600 cc of 1.05 sp. gr. $H_2SO_4$. The anode collector tab was connected to the negative lead of a Hewlett Packard Model 6611C DC power supply. The cathode collector tab was connected to the positive lead. The cell was formed at 0.12 ampere for 23.8 hours. The formation electrolyte (1.05 sp. gr. $H_2SO_4$) was decanted and replaced with 1.28 sp. gr. $H_2SO_4$. The cell received a brief finishing charge, 0.12 ampere for 0.25 hour. After a stand time of 0.25 hour, the open circuit voltage was 2.22 volts. The cell was discharged at 0.3 amp to a cut off voltage of 1.75 volts, yielding 0.411 ampere-hour.

EXAMPLE 21

LMO Graphite Secondary Cell

TABLE 3

|  | Anode | Cathode | Separator |
|---|---|---|---|
| Graphite[1], g | 153.6 |  |  |
| Carbon Black[2], g | 5.7 | 17.9 |  |
| LMO[3], g |  | 210.7 |  |
| Fumed Silica[4], g |  |  | 20.8 |
| UHMWPE[5], g | 7.0 | 14.0 | 16.2 |
| Oil[6], 9 | 64.6 | 69.1 | 156.9 |

[1]BG-35, Superior Graphite Co.
[2]Super P, MMM Carbon
[3]$LiMn_2O_4$, Japan Energy Corporation
[4]Areosil R812S, Degussa Corporation
[5]1900 HCM, Montell USA Inc.
[6]ShellFlex ™ 3681, Shell Oil Co.

The components of a LMO graphite secondary cell manufactured in accordance with Example 21 are set out in Table 3. The UHMWPE and oil (64.6 g), both listed in the anode formula in Table 3, were blended in a 600 ml tall form beaker with a spatula until a slurry formed. This slurry was transferred to a HAAKE Rheomix 600 miniature intensive mixer fitted with roller blades and driven by a HAAKE Rheocord 90 torque Rheometer, turning at 80 RPM and set at 180° C. A gel was formed, as indicated by the torque peak, approximately three minutes after the slurry was introduced to the miniature intensive mixer. The remaining dry anode ingredients listed in Table 3 were combined in a 600 ml tall form beaker and blended with a spatula. Approximately five minutes after the gellation torque peak, the blended dry anode ingredients were added to the miniature intensive mixer. This mixture was compounded for approximately five minutes, resulting in a homogeneous, cohesive mass.

This mass was transferred to a C. W. Brabender Prep-Mill Model PM-300, two-roll mill, turning at 15 rpm and set at 175° C. The roll gap was adjusted to about 0.3 mm, and a sheet was removed from the rolls with the take-off knife. An 8 cm×8 cm square was cut from this anode film, placed between aluminum foil cover sheets, transferred to a Carver Laboratory Press, and 143° C. pressed to a thickness of 0.10 mm at a pressure of approximately 2,500 kPa. The film was allowed to cool to room temperature, and the aluminum foil cover sheets were removed.

The procedure above was followed for the cathode formula listed in Table 3, using UHMWPE (14 g) and oil (69.1 g). In this case, the cathode film from the two-roll mill was pressed to a thickness of 0.15 mm, at a pressure of approximately 2,500 kPa in the Carver Laboratory Press.

All of the ingredients listed in the separator formula in Table 3 were blended in a 600 ml tall form beaker with a spatula until a slurry formed. The slurry was transferred to a HAAKE Rheomix 600 miniature intensive mixer fitted with roller blades and driven by a HAAKE Rheocord 90 torque Rheometer, turning at 80 RPM and set at 180° C. A gel formed, as indicated by the torque peak, approximately three minutes after the slurry was introduced to the miniature intensive mixer. This mixture was compounded for approximately five minutes, resulting in a homogeneous, cohesive mass. A 0.05 mm separator film was formed from a portion of this mass using the two-roll mill, laboratory press, and the technique described above.

A 4 cm×6 cm rectangle was cut from both the anode and cathode films. A 6 cm×8 cm rectangle was cut from the separator film. A 4 cm×6 cm anode collector with a 1.5 cm×6 cm take-off tab was cut from expanded copper foil, 2Cu6-410F made by Exmet Corporation. This foil was 0.05 mm thick and had a strand thickness of 0.18 mm. A 4 cm×6 cm cathode collector with a 1.5 cm×6 cm take-off tab was cut from expanded aluminum foil, 2AL6-40F, made by Exmet Corporation. This foil was 0.05 mm thick and had a strand thickness of 0.18 mm.

The collectors, oil-filled sheets, and separator were stacked in the following order: copper collector, anode film, separator, cathode film, and aluminum collector. This stack was then laminated in a Model C Carver Laboratory Press, at about 143° C. and at a pressure not greater than 100 kPa. The laminated cell stack was extracted in a tall form 600 ml beaker of trichloroethylene with a magnetic stir bar turning at 100 rpm. This procedure was repeated three times with fresh trichloroethylene to ensure that the oil was fully extracted. The trichloroethylene-laden cell stack was dried in a fume hood for five minutes at 20° C., followed by 15 minutes at 90° C. in a forced air oven.

A cell case and slotted cover were fabricated from a 12 mm UHMWPE billet. The internal cell dimensions were approximately 1 mm×70 mm×100 mm. The anode and cathode collector tabs of the extracted, oil-free cell assembly were inserted through the cover slot and fixed in place with epoxy resin so that when the cell cover was in place, the cell assembly touched the bottom of the cell cavity. The cell assembly, attached cell cover, cell case, a stand, support rod, clamp, 2 cc ground glass syringe, and 100 mm 20 gauge SS pipetting needle were dried in a forced air oven at 110° C. for 16 hours.

Grade 5.0 nitrogen was supplied from 2 H-size gas cylinders to a Manostat Model 41-905-000 glove box and air lock via a manifold composed of 6 mm polyflow tubing, two Matheson Model 3102C-580 dual stage regulators, and a Gilmont Model GF-5521-1700 flow meter. The moisture level inside the glove box was monitored with a Labcraft digital hygrometer. A factory sealed one liter flask of EM Industries, Inc., Selectipur® LP30 (EC:DMC=1:1 w/w, 1M $LiPF_6$) lithium hexafluorophosphate electrolyte was placed in the glove box, and the glove box was purged with grade 5.0 nitrogen at approximately 16.5 liters per minute for 1 hour. This reduced the dew point inside the glove box to −40° C. The cell assembly, attached cell cover, cell case, stand, support rod, clamp, 2 cc ground glass syringe, and 100 mm 20 gauge SS pipetting needle were transferred from the forced air oven to the glove box air lock. After 20 minutes the cell assembly, attached cell cover, cell case, stand, support rod, clamp, 2 cc ground glass syringe, and 100 mm 20 gauge SS pipetting needle were transferred from the air lock to the glove box.

Inside the glove box, the cell case was fixed in an upright position by means of the stand, support rod, and clamp. Approximately five milliliters of LP30 electrolyte was transferred to the cell case using the syringe and pipetting needle. The cell assembly was inserted into the cell case. The anode collector tab was connected to the negative terminal of a Hewlett Packard Model 6611 C DC power supply by means of leads passed through glove box wall via gas tight connections. The cathode collector tab was connected to the positive terminal by similar means. The power supply voltage limit was set to 4.2 volts, and the current limit was set to 0.0121 ampere. Over the next hour the nitrogen flow was gradually reduced to 3.2 liters per minute. This was sufficient to maintain the dew point inside the glove box at −40° C.

The on-charge cell voltage gradually increased to 4.2 volts after 3.93 hours. The charging current gradually decreased and charging was terminated after 8.18 hours, at approximately 0.0005 ampere. The cell was discharged at 0.0121 ampere for 3.78 hours to a cut off voltage of 2.7 volts. The data for the first three charge discharge cycles is summarized in Table 4 below.

TABLE 4

| Cycle | Capacity, mAh | Rate mA |
| --- | --- | --- |
| 1st Charge | ~61.6 | 12.1 |
| 1st Discharge | 34.7 | 12.1 |
| 2nd Charge | ~45.8 | 12.1 |
| 2nd Discharge | 32.3 | 12.1 |
| 3rd Charge | ~29.1 | 12.1 |
| 3rd Discharge | 32.9 | 30.5 |

EXAMPLE 22

Alkaline Manganese Dioxide Primary Cell

TABLE 5

|  | Anode | Cathode |
| --- | --- | --- |
| Zinc Dust[1], g | 56.0 |  |
| Manganese Dioxide[2], g |  | 32.0 |
| Graphite[3], g |  | 4.0 |
| UHMWPE[4], g | 2.1 | 2.6 |
| Oil[5], g | 17.2 | 20.0 |

[1]Zinc Dust <10 μm, 98%; Aldrich Chemical Co.
[2]Electrolytic Manganese Dioxide AB Grade, Kerr-McGee Chemical LLC
[3]BG-35, Superior Graphite Co.
[4]1900 HCM, Montell USA Inc.
[5]ShellFlex ™ 3681, Shell Oil Co.

The components of an alkaline manganese dioxide primary cell manufactured in accordance with Example 22 are set out in Table 5. The dry anode ingredients in Table 5 were combined in a 600 ml tall form beaker and blended with a spatula. While blending continued, oil (12 g) was added to the mixture. Blending continued until a free flowing powder was formed.

This free flowing powder was added to a HAAKE Rheomix 600 miniature intensive mixer fitted with roller blades and driven by a HAAKE Rheocord 90 torque Rheometer, turning at 80 RPM and set at 180° C. The remaining oil (5.2 g) was added to the miniature intensive mixer. This mixture was compounded for approximately five minutes, resulting in a homogeneous, cohesive mass. This mass was transferred to a C. W. Brabender Prep-Mill Model PM-300, two-roll mill, turning at 15 rpm and set at 175° C. The roll gap was adjusted to about 0.3 mm, and a sheet was removed from the rolls with a take-off knife. An 8 cm×8 cm square was cut from this anode film, placed between aluminum foil cover sheets, transferred to a Carver Laboratory Press, and 143° C. pressed to a thickness of 0.13 mm at a pressure of approximately 2,500 kPa. The film was allowed to cool to room temperature, and the aluminum foil cover sheets were removed.

The procedure above was repeated for the cathode formula with the following exceptions: the oil (15 g) was blended with the dry ingredients, additional oil (5 g) was added to the miniature intensive mixer, the gap on the two-roll mill was set to about 0.6 mm, and the Carver Laboratory Press was not used.

Two rectangles, each measuring 4 cm×6 cm, were cut from both the anode and cathode films. One 6 cm×8 cm rectangle was cut from a nonwoven, polyamide separator (BG06836; 0.13 mm thick; Hollingsworth & Vose Co.). A 4 cm×6 cm anode collector with a 2 cm×10 cm take-off tab was cut from expanded copper foil, 2CU6-4/OF made by Exmet Corporation. This foil was 0.05 mm thick and had a strand thickness of 0.18 mm. A 4 cm×6 cm cathode collector with a 2 cm×10 cm take-off tab was cut from expanded nickel foil, 3Ni4-4-OA, made by Exmet Corporation. This foil was 0.08 mm thick and had a strand thickness of 0.1 mm.

The oil-filled sheets, collectors, and separator were stacked in the following order: anode film, copper collector, separator, nickel collector and, cathode film. This stack was then laminated in a Model C Carver Laboratory Press, at about 143° C. and at a pressure not greater than 100 kPa. This laminated cell stack was extracted in a tall form 600 ml beaker of trichloroethylene with a magnetic stir bar turning at 100 rpm. This procedure was repeated three times with fresh trichloroethylene to ensure that the oil was fully extracted. The trichloroethylene-laden cell stack was dried in a fume hood for five minutes at 20° C., followed by 15 minutes at 90° C. in a forced air oven.

The resultant porous assembly was immersed in a 250 ml specimen jar containing an aqueous solution of 33 wt. % potassium hydroxide and approximately 0.4 wt. % of a nonionic surfactant, composed of an aromatic polyglycol ether. The cell stack and jar were placed in a vacuum desiccator, which was evacuated to a pressure of 125 mm of Hg for one minute, after which the vacuum was released. This evacuation release cycle was repeated five times. The saturated cell stack was placed in a 75 mm×125 mm polyethylene bag so that the current collectors protruded from the bag. The open circuit voltage for this cell was 1.39 volts. The cell was given a series of 10 minute constant resistance discharges with a one hour rest period between them. The beginning and ending voltages and currents are summarized in Table 6.

TABLE 6

| Minutes | Ohms | Volts | Milliamperes |
|---|---|---|---|
| 0 | 1.120 | 1.39 | 1.18 |
| 10 | 1.120 | 1.24 | 1.11 |
| 0 | 490 | 1.35 | 2.49 |
| 10 | 490 | 1.10 | 2.29 |
| 0 | 330 | 1.33 | 3.39 |
| 10 | 330 | 0.99 | 3.00 |

A second implementation of this preferred embodiment is the use of the freestanding microporous film in a double-layer (super) capacitor. The following example is illustrative of use of the present invention in a double-layer capacitor.

EXAMPLE 23

Carbon Black, Ensaco 350 GR Capacitor

TABLE 7

|  | Electrode | Separator |
|---|---|---|
| Carbon Black[1], g | 11.0 |  |
| Silica[2], g |  | 7.0 |
| Colorant[3], g |  | 0.2 |
| Lubricant[4], g |  | 0.03 |
| Antioxidant[5], g |  | 0.03 |
| UHMWPE[6], g | 1.0 | 2.4 |
| Oil[7], 9 | 42.0 | 18.0 |

[1]Ensaco 350 GR, Erachem Europe
[2]Hi-Sil ® SBG precipitated silica, PPG Industries, Inc.
[3]ACC 10319E, Allied Color Industries, Inc.
[4]Petrac ® CZ-81, Synthetic Products Corp.
[5]Irganox ® B-215, Ciba-Geigy Corp.
[6]1900 HCM, Montell USA Inc.
[7]ShellFlex ™ 3681, Shell Oil Co.

The components of a carbon black, Ensaco 350 GR capacitor manufactured in accordance with Example 23 are set out in Table 7. The dry electrode ingredients in Table 7 were combined in a 600 ml tall form beaker and blended with a spatula. Oil (28 g) was then added to the beaker while blending with a spatula. Once thoroughly blended, this mixture formed a free flowing powder.

This free flowing powder was added to a HAAKE Rheomix 600 miniature intensive mixer fitted with roller blades and driven by a HAAKE Rheocord 90 torque Rheometer, turning at 80 RPM and set at 180° C. The remaining oil (14 g) was added to the miniature intensive mixer. This mixture was compounded for approximately five minutes, resulting in a homogeneous, cohesive mass. This mass was transferred to a C. W. Brabender Prep-Mill, Model PM-300, two-roll mill, turning at 15 rpm and set at 175° C. The roll gap was adjusted to about 0.4 mm, and a sheet was removed from the rolls with the take-off knife.

The procedure above was repeated for the separator formula with the following exceptions: oil (12 g) was blended with the dry ingredients in a 600 ml tall form beaker, additional oil (6 g) was added to the miniature intensive mixer, the temperature of the two-roll mill was approximately 173° C., and the gap on the two-roll mill was set to about 0.3 mm. An 8 cm×8 cm square was cut from this separator sheet, placed between aluminum foil cover sheets, transferred to a Carver Laboratory Press, at 143° C., and pressed to a thickness of 0.10 mm at a pressure of approximately 2,500 kPa. The film was allowed to cool to room temperature and the aluminum foil cover sheets were removed.

Two 4 cm×6 cm rectangles were cut from the electrode sheet. One 6 cm×8 cm rectangle was cut from the separator film. Two 4 cm×6 cm current collectors with 2 cm×10 cm take-off tabs were cut from expanded titanium foil, 2Ti3.5-4/OA made by Exmet Corporation. This foil was 0.05 mm thick and had a strand thickness of 0.09 mm. The collectors, oil-filled sheets, and separator film were stacked in the following order: collector, electrode sheet, separator film, electrode sheet, and collector. This stack was then laminated in a Model C Carver Laboratory Press, at about 143° C. and at a pressure not greater than 100 kPa. This laminated capacitor assembly was extracted in a tall form 600 ml beaker of trichloroethylene with a magnetic stir bar turning at 100 rpm. This procedure was repeated three times with fresh trichloroethylene to ensure that the oil was fully extracted. The trichloroethylene-laden capacitor was dried in a fume hood for five minutes at 20° C., followed by 15 minutes at 90° C. in a forced air oven.

The resultant porous capacitor assembly was immersed in a 250 ml specimen jar containing 1.28 sp. gr. $H_2SO_4$ electrolyte. The capacitor assembly and jar were placed in a vacuum desiccator, which was evacuated to a pressure of 125 mm of Hg for one minute, after which the vacuum was released. This evacuation release cycle was repeated five times. The saturated capacitor was placed in a 75 mm×125 mm polyethylene bag so that the current collectors protruded from the bag.

The capacitor collector tabs were connected to the terminals of a Hewlett Packard Model 6611C DC power supply. The power supply voltage limit was set to 1.2 volts, and the current limit was set to 1 ampere. The initial current was 71 milliamperes, decaying exponentially to 19 milliamperes after 10 minutes. After 10 minutes, the power supply was disconnected and the open circuit voltage of the capacitor was recorded. The initial open circuit voltage was 0.98 volt, decreasing to 0.65 volt 10 minutes after power supply disconnection. Although equipment necessary to quantify capacity in farads was unavailable, the behavior above is consistent with a functioning capacitor.

Figures 3, 4:
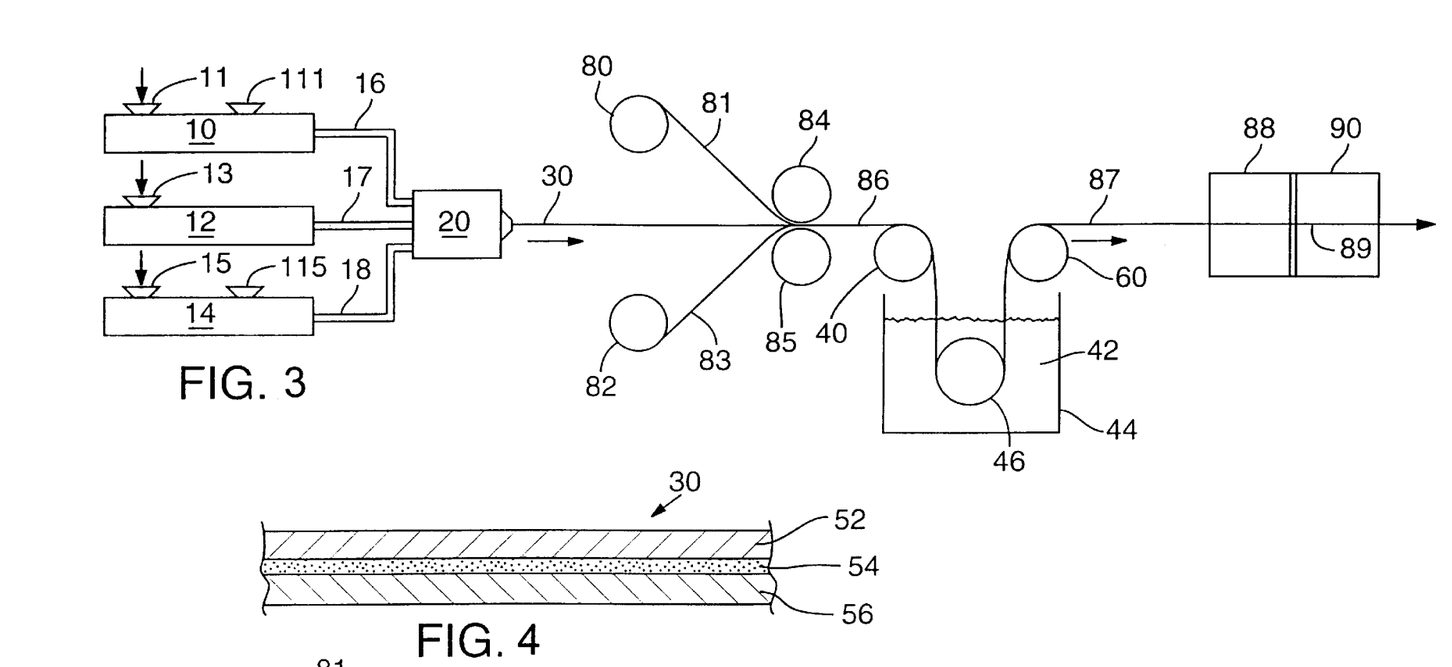
FIG. 3 is a schematic diagram showing a continuous process for forming the cell assemblies of this invention.
FIG. 4 is a cross-sectional view of the electrode assembly of this invention.

A third preferred embodiment of the invention is a continuous coextrusion process in which multiple extruders are used to simultaneously produce a multiple layer film composed of individual anode, cathode, and separator layers. The resultant muliple layer film with current collectors is cut to size and filled with electrolyte to produce an energy storage device. FIG. 3 illustrates a continuous coextrusion process for forming the electrode assemblies of the present invention. The process illustrated employs three extruders and a coextrusion die.

An extruder 10 has a metering section containing a feed port 11 by means of which a suspension of a polymer in a non-evaporative plasticizer is fed into the extruder. Extruder 10 has a second metering section containing second feed port 111 by means of which an anode active material is fed into the second (down stream) metering section.

An extruder 12 has a metering section containing a feed port 13 by means of which a suspension of polymer and filler in a nonevaporative plasticizer is fed into the extruder. An extruder 14 has a metering section containing a feed port 15 by means of which a suspension of a polymer in a non-evaporative plasticizer is fed into the extruder. Extruder 14 has a second metering section containing second feed port 115 by means of which a cathode active material is fed into the second (down stream) metering section.

Extruders 10, 12, and 14 are, preferably, twin screw extruders having mixing and conveying sections. The twin screw extruders may have screws that are either co-rotating or counter-rotating. The temperatures employed in the extruders are such as to ensure that the polymer is solvated by the plasticizer, but not so high as to cause degradation of any component of the slurry composition during its residence time in the extruder. Although twin screw extruders are preferred, other means for applying heat and shear to the various slurries may be used, such as, for example, a Farrel continuous mixer.

The anode extrudate is conveyed from extruder 10 to a coextrusion die 20 via a heated pipe 16; the separator extrudate is conveyed from extruder 12 to coextrusion die 20 via a heated pipe 17; and the cathode extrudate is conveyed from extruder 14 to coextrusion die 20 via a heated pipe 18. Melt pumps may be used to feed the. extrudates from extruders 10, 12, and/or 14 to coextrusion die 20.

Coextrusion die 20 may be either a sheet die or a blown film die. If a blown film is formed, its tubular construction may be slit into a wider, single thickness web before extraction of the plasticizer.

Although not illustrated, if a sheet die is used, it may be desirable to pass a resultant three-layer precursor film 30 through the nip of two or more calender rolls to aid in controlling film thickness and other properties. Alternatively, the hot precursor film 30 may be cast onto a quench roll and a series of draw down rolls used to control film thickness and other properties.

In addition, three-layer precursor film 30, whether formed in a blown film die, as a calendered film from a sheet die and calender stack, or as a melt cast film from a sheet die and quench roll, can be drawn in the machine and/or cross machine direction by means of a tentering frame to modify film thickness and other properties.

The three-layer film 30 formed by coextrusion die 20, with or without modification by various intermediate processes, is fed along with an anode collector 81 and a cathode collector 83 into the nip of laminating rolls 84 and 85 to form a complete cell structure. The current collectors in roll stock form are supplied from unwind stations 80 and 82 to the laminating rolls.

A five-layer cell structure 86, which includes three-layer precursor film 30, is fed around roll 40 and into an extraction bath 42 contained in tank 44. The five-layer cell structure then passes around a roll 46 and exits tank 44. The portion of the five-layer cell structure 86 comprised of three-layer precursor film 30 has substantially all of the contained plasticizer removed by the solvent in extraction bath 42. The extracted five-layer cell structure passes around roll 60 and enters a drying section 88 where the solvent is volatilized.

The extracted solvent-free five-layer cell structure 89 passes into a controlled moisture environment 90 where the cell structure is cut to length, cut lengths are assembled into individual batteries, electrolyte is introduced, and other final assembly operations are carried out. When the cell structure is cut to length, the continuous portion of the battery production ends.

The extraction process has been illustrated as being carried out in tank 44 for ease of illustration. However, the extraction is preferably carried out in an extractor similar to that described in U.S. Pat. No. 4,648,417. After extrusion, the resultant multiple layer cell structure can be further calendered to control porosity and layer thickness. (This is true irrespective of whether current collectors are present.)

Figure 5:
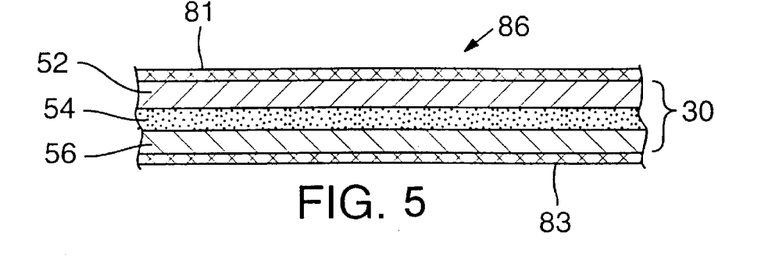
FIG. 5 is a cross-sectional view of an electrochemical cell incorporating the electrode assembly of this invention.

The continuously produced multiple (three)-layer cell assembly 30 (before extraction) and multiple (five)-layer electrochemical cell structure 89 are illustrated in FIGS. 4 and 5, respectively. As can be seen, cell structure 89 is comprised of an anode current collector 81, an anode layer 52, a separator layer 54, a cathode layer 56, and a cathode current collector 83.

Although the process of forming the multiple layer cell structure of this invention is preferably accomplished by coextruding the anode, separator, and cathode; laminating current collectors; extracting the plasticizer; and removing the extraction solvent in a continuous series of operations, the operations can be performed separately or in various combinations. If the anode, separator, and cathode layers are formed separately, they would preferably be laminated to each other and to their respective current collectors before solvent extraction of the plasticizer to promote coherent bonding between the adjacent layers. However, it may be desirable to extract the plasticizer from one or more of these layers in a separate operation and subsequently laminate the extracted layers. If the anode, cathode, and separator layers are formed separately, it may be desirable to pass the respective extrudate from each extruder through a calender roll stack to aid in controlling film thickness and other parameters. A suitable such calender roll stack is disclosed in U.S. Pat. No. 4,734,229. After solvent extraction of the plasticizer, the cell assembly is passed into a controlled moisture environment, as is well known in the art.

Whether the anode, cathode, and separator films are formed separately or as a multiple layer film, the film or films may be oriented (stretched) in the machine direction, cross-machine direction, or both, before or after solvent extraction of the plasticizer from the film but prior to lamination to current collectors.

After the electrochemical cell assembly is formed, the web is cut to size, packaged, and grouped into batteries. The packaged cell assemblies are then filled with electrolyte and sealed, all in a manner known in the art.

The anode precursor of the present invention preferably comprises a plasticizer, a polymer matrix containing UHMWPE, and a carbon material. Natural or synthetic graphite is a preferred carbon material. Other carbonaceous materials that can be used include carbon black, lamp black, coke, carbon fibers, or mesocarbon, or mixtures thereof. The anode may also include other minor ingredients.

The cathode precursor of the present invention preferably comprises a plasticizer, a polymer matrix containing UHMWPE, and a cathode filler, the last of which is a mixture of compounds that will form a cathodic insertion complex with lithium ions and an electroconductive material. Such cathodic materials are well known in the art. Examples include: oxides of cobalt, manganese, molybdenum, vanadium, chromium and copper; sulfides of titanium, molybdenum and niobium; lithiated cobalt oxides (e.g., $LiCoO_2$ and $LiCoVO_4$); lithiated manganese oxides (e.g., $LiMn_2O_4$); lithiated nickel oxides (e.g., $LiNiO_2$ and $LiNiVO_4$); and mixtures thereof. Other examples include cathode-active material blends of $Li_xMn_2O_4$ (spinel) described in U.S. Pat. No. 5,429,890. The blends can include $Li_xMn_2O_4$ (spinel) and at least one lithiated metal oxide material selected from $Li_xNiO_2$ and $Li_xCoO_2$ wherein $0<x\leq2$.

U.S. Pat. No. 5,778,515 discloses that the cathodic material may be mixed with an electroconductive material, such as graphite, powdered carbon, powdered nickel particles, conductive polymers, and the like. It is preferred to include such an electroconductive material in the cathodes formed in the present invention.

The separator precursor is formed from a mixture of a plasticizer, a polymer matrix containing UHMWPE, and a filler or fillers such as precipitated silica, fumed silica, chemically modified precipitated silica, chemically modified fumed silica, or lithium phosphate. The preferred filler is fumed hydrophobic silica. Examples of such silicas include Degussa Areosil R812S and J. M. Huber Cab-Osil TS-530.

EXAMPLE 24

Anode Precursor Composition

A two-part anode precursor composition was prepared by forming a suspension of polymer and plasticizer, and an anode active material mixture.

The polymer plasticizer suspension was prepared in a 15 liter cylinder, using a Lightning Model Paratrol A mixer, turning at 800 rpm. The components of the suspension consisted of: Shellflex™ 3681 naphthenic process oil (2,154.3 g), manufactured by Shell Oil, and Montel 1900H™ UHMWPE (232.5 g), manufactured by Montel. The oil was added first, followed by the UHMWPE. After both components were added, mixing continued for ten minutes at ambient temperature. After initial mixing was complete, the mixer speed was maintained at 500 rpm to prevent separation.

The anode active material mixture was prepared in a Littleford Model W-10 mixer. The components of the anode active material consisted of: BG-35™ graphite (5,118.5 g), manufactured by Superior Graphite Co., and Super P™ carbon black (189.2 g), manufactured by MMM Carbon. The graphite was added first, followed by the carbon black. Mixing was carried out at 1,000 rpm for three minutes at ambient temperature. The final anode film composition is determined when the UHMWPE/plasticizer suspension and the anode precursor composition are metered together as in Example 27.

EXAMPLE 25

Cathode Precursor Composition

A two-part cathode precursor composition was prepared by forming a suspension of polymer and plasticizer, and a cathode active material mixture.

The polymer and plasticizer suspension was prepared in a 15 liter cylinder using a Lightning Model Paratrol A mixer, turning at 1,000 rpm. The components of the suspension, in order of addition to the mixer cylinder, consisted of: Shellflex™ 3681 naphthenic process oil (3,636 g), manufactured by Shell Oil, and Montel 1900H™ UHMWPE (377 g), manufactured by Montel.

The cathode active material mixture was prepared in a Littleford Model W-10 mixer. The components of the cathode active material mixture, in the order of addition to the mixer, consisted of: Super P™ carbon black (954 g), manufactured by MMM, and lithium-manganese oxide powder (11,240.2 g), manufactured by Japan Energy Corporation. After all the ingredients were added, mixing continued at 1,000 rpm for three minutes at ambient temperature. The final cathode film composition is determined when the UHMWPE/plasticizer suspension and the cathode precursor composition are metered together as in Example 27.

EXAMPLE 26

Separator Precursor Composition

A separator precursor composition slurry was prepared in a 15 liter cylinder using a Lightning Model Paratrol A mixer, turning at 800 rpm. The components of the slurry, in order of addition to the mixer cylinder, consisted of: Shellflex™ 3681 naphthenic process oil (2,359.6 g) manufactured by Shell Oil; Montel 1900H™ UHMWPE (243.6 g) manufactured by Montel; and Aerosil R812S™ hydrophobic fumed silica (312.8 g) manufactured by Degussa. After all the ingredients were added, mixing continued for ten minutes. All mixing was done at ambient temperature. After initial mixing, the mixer speed was maintained at 500 rpm to prevent separation.

EXAMPLE 27

Formation of Individual Films

The polymer and plasticizer suspension prepared in Example 24 was metered into the feed port of a twin screw extruder using a modified Ktron type K-SFS-24/6 gravimetric feeder, controlling a Cole-Parmer Masterflex Model 77300-50 peristaltic pump. A 15 liter cylinder mounted on the load cell containing the anode slurry supplied the peristaltic pump. A Lightning Lab Master Model PH-1 mixer mounted above the cylinder and turning at 500 rpm maintained the slurry in suspension. The polymer and plasticizer suspension was metered into the feed port at a rate of 19.4 grams per minute.

The anode active material mixture prepared in Example 24 was metered into a second feed port located 250 mm downstream from the primary feed port. The anode active material mixture was metered into the second feed port at a rate of 43 grams per minute using a Ktron type K-SFS 24/6 gravimetric feeder.

The extruder was a co-rotating twin screw extruder manufactured by Betol Machinery LTD, which had a barrel diameter of 40 mm and a length to diameter ratio of 30:1. The extruder barrel temperature was 180° C., the screw speed was 46 rpm, and the extruder residence time was four minutes.

The extrudate from the extruder was fed into a sheet die with a width of 40 mm and a die opening of 0.1 mm. The sheet issuing from the die was cut into pieces 60 mm long.

The procedure was repeated for the polymer and plasticizer suspension and cathode active material mixture prepared in Example 25 with the exception that the polymer and plasticizer suspension was metered at 33.7 grams per minute, the cathode active material mixture was metered at 93.1 grams per minute, the extruder screw speed was 69 rpm, and the die opening was 0.15 mm.

The procedure was also repeated for the separator slurry prepared in Example 26 with the exception that the separator slurry was metered into the first extruder feed port at 24.7 grams per minute, the second feed port was closed, the extruder screw speed was 30 rpm, the die opening was 0.05 mm, and the sheet issuing from the die was cut into pieces 80 mm long.

EXAMPLE 28

Formation of a Cell Assembly

An anode collector was made in the form of an 80 mm×40 mm rectangle cut from a 0.04 mm thick MicroGrid™ expanded copper foil, made by Delker Corporation under Part No. 1.5Cu6-077F.

A cathode collector was made in the form of an 80 mm×40 mm rectangle cut from a 0.05 mm thick Micro-Grid™ expanded aluminum foil made by Delker Corporation under Part No. 2A16-077F.

A lay up for the multiple layer cell assembly was formed by laying the anode sheet formed in Example 27 on top of the anode collector, such that a 20 mm×40 mm portion of the collector was left uncovered to serve as a current lug. The separator sheet formed in Example 27 was laid on top of the anode sheet so that the separator sheet overlapped the anode sheet evenly on all sides. The cathode sheet formed in Example 27 was laid on top of the separator sheet such that the separator sheet overlapped the cathode sheet evenly on all sides. The cathode collector was laid on top of the cathode sheet such that a 20 mm×40 mm portion of the collector was left uncovered to serve as a current lug. The multiple layer cell thus laid up was laminated in a Model C Carver Lab Press at a pressure of 2 psi and at a temperature of 250° C. for 60 seconds.

The laminated cell assembly was extracted under a hood in 500 ml of trichloroethylene at ambient temperature for twenty minutes. After the cell assembly was removed from the extraction solvent, the residual trichloroethylene was allowed to evaporate under a hood at ambient temperature for one hour. The plasticizer remaining after extraction was about 7% by weight of the multiple layer cell assembly, not including the current collectors. Current leads were supplied in the form of stainless steel wires spot welded to each current lug.

The extracted multiple layer cell assembly was dried at 60° C. for six hours and transferred to a glove box purged with dry nitrogen. The cell assembly was allowed to freely imbibe an electrolyte consisting of a 1 mol/L solution of lithium hexafluorophosphate in a 50:50 by volume mixture of dimethyl carbonate and ethylene carbonate. The electrolyte saturated cell assembly was placed in a Mylar pouch with the current leads extending outside the pouch. The pouch was made gas tight by heat sealing the open side of the couch over the current leads.

This cell was removed from the glove box, and the anode collector tab was connected to the negative terminal of a Hewlett Packard Model 6611 C DC power supply. The cathode collector tab was connected to the positive terminal by similar means. The power supply voltage limit was set to 4.2 volts, and the current limit was set to 0.0121 ampere. The on-charge cell voltage gradually increased to 4.2 volts after 3.93 hours. The charging current gradually decreased, and charging was terminated at approximately 0.0005 ampere. The cell was discharged at 0.0121 ampere to a cut off voltage of 2.7 volts. The cell performance was similar to that of Example 21, Table 4.

It will be obvious to those having skill in the art that many changes may be made to the details of the above-described embodiments of this invention without departing from the underlying principles thereof. The scope of the present invention should, therefore, be determined only by the following claims.

What is claimed is:

1. A freestanding, electrically conductive polymer web, comprising:
    an extruded polymer matrix binding a material composition having electrical conductivity properties, the polymer matrix including an ultrahigh molecular weight polyolefin of a molecular weight that provides sufficient molecular chain entanglement to form a microporous web having freestanding characteristics and having pores encompassing a volume fraction of between about 0.20 and about 0.8.

2. The polymer web of claim 1, further comprising a metallic layer that is applied to the polymer web to form a metallized electric current collector.

3. The polymer web of claim 1, in which the material composition having electrical conductivity properties comprises an electrochemically active powder.

4. The polymer web of claim 1, in which the material composition having electrical conductivity properties comprises an electrochemically active powder in combination with an electrically conductive agent.

5. The polymer web of claim 1, in which the ultrahigh molecular weight polyolefin is ultrahigh molecular weight polyethylene.

6. The polymer web of claim 1, in which the ultrahigh molecular weight polyolefin is combined with one or more of polyvinylidene fluoride, polyvinylidene fluoride copolymer, polyethylene oxide, and polyacrylonitrile in sufficient amount to form a gelled electrolyte after introduction of a liquid electrolyte.

7. In an energy storage device of a type having multiple electrodes and wound or stacked in a package filled with an electrolyte, the improvement comprising:
    a microporous web having freestanding characteristics and including an extruded polymer matrix binding a material composition having electrical conductivity properties, the polymer matrix including an ultrahigh molecular weight polyolefin in an amount and of a molecular weight that provide sufficient molecular chain entanglement to form an electrode.

8. The energy storage device of claim 7, in which the material composition having electrical conductivity properties comprises an electrochemically active powder.

9. The energy storage device of claim 8, in which the electrochemically active powder includes lithium intercalation compounds including lithium nickel oxide, lithium cobalt oxide, and lithium manganese oxide; lead (II) oxide, lead (II, III) oxide, and mixtures of lead and lead oxide; manganese dioxide; zinc oxide; nickel; zinc; lead; silver; iron; iron oxides; metal hydrides including lanthanum-nickel ($LaNi_5$); cobalt oxides; hydroxides of nickel, zinc, and cadmium, and cobalt; crystalline or amorphous carbonaceous materials in the form of fiber, powder, or microbeads including natural or synthetic graphite, carbon black, coke, mesocarbon microbeads, or activated carbon.

10. The energy storage device of claim 7, further comprising a metallic layer that is applied to the polymer web to form a metallized electric current collector for the energy storage device.

11. The energy storage device of claim 10, in which the metallic layer includes one of a metallic-grid, perforated metal sheet, metal film, and metal foil.

12. The energy storage device of claim 10, in which the metallic layer includes one of a metal film formed by sputter deposition on, electroless deposition on, electrodeposition on, plasma spraying on, or roll coating of a metal slurry on the microporous web; or a porous or nonporous metal foil laminated to the microporous web.

13. The energy storage device of claim 7, gain which the ultrahigh molecular weight polyolefin is ultrahigh molecular weight polyethylene.

14. An electrode assembly formed as a multi-layer web, comprising:
   a microporous separator layer positioned between and coherently bonded to a microporous anode layer and a microporous cathode layer;
   the microporous separator layer formed as an extruded web from an ultrahigh molecular weight polyolefin; and
   each of the microporous anode layer and microporous cathode layer formed as an extruded web from a mixture of an ultrahigh molecular weight polyolefin and a material composition having electrical conductivity properties.

15. The electrode assembly of claim 14, in which the separator layer further comprises an electrically nonconductive filler.

16. The electrode assembly of claim 14, further comprising a pair of current collector layers each of which bonded to a different one of the anode and cathode layers to form an electrochemical cell.

17. The electrode assembly of claim 14, in which the coherent bond between the separator layer and each of the anode and cathode layers is accomplished by one of extrusion or lamination.

18. The polymer web of claim 1, in which the polymer matrix of the microporous web does not exceed a volume fraction of about 0.25.

* * * * *

UNITED STATES PATENT AND TRADEMARK OFFICE
CERTIFICATE OF CORRECTION

PATENT NO. : 6,524,742 B1  Page 1 of 1
DATED : February 25, 2003
INVENTOR(S) : Emanuel et al.

It is certified that error appears in the above-identified patent and that said Letters Patent is hereby corrected as shown below:

<u>Title page,</u>
Item [74], *Attorney, Agent or Firm*, delete "Stole" and insert -- Stoel --

Item [57], ABSTRACT,
Line 7, delete "sheet, with" and insert -- sheet with --

<u>Column 1,</u>
Line 45, delete "at. traditional" and insert -- at traditional --

<u>Column 9,</u>
Line 28, delete "600.miniature" and insert -- 600 miniature --

<u>Column 13,</u>
Line 62, delete "and-electrochemically" and insert -- and electrochemically --

<u>Column 21,</u>
Line 35, delete "the." and insert -- the --

<u>Column 27,</u>
Line 7, delete "gain which" and insert -- in which --

Signed and Sealed this

Twenty-third Day of September, 2003

JAMES E. ROGAN
*Director of the United States Patent and Trademark Office*